United States Patent
Warren (10) Patent No.: US 10,367,321 B2
(45) Date of Patent: *Jul. 30, 2019

(54) HIGH-DENSITY BRIDGE ADAPTER

(71) Applicant: HD Networks, LLC, Stuart, FL (US)

(72) Inventor: David N. Warren, Stuart, FL (US)

(73) Assignee: HD Networks, LLC, Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,326

(22) Filed: Jan. 7, 2019

(65) Prior Publication Data

US 2019/0140412 A1     May 9, 2019

Related U.S. Application Data (63) Continuation-in-part of application No. 15/981,444, filed on May 16, 2018, now Pat. No. 10,177,516, which is a continuation-in-part of application No. 15/864,891, filed on Jan. 8, 2018, which is a continuation-in-part of application No. 15/167,462, filed on May 27, 2016, now Pat. No. 9,865,976.

(60) Provisional application No. 62/166,878, filed on May 27, 2015.

(51) Int. Cl.
| | | |
|---|---|---|
| H01R 3/00 | (2006.01) | |
| H01R 31/06 | (2006.01) | |
| H01R 13/04 | (2006.01) | |
| H01R 13/64 | (2006.01) | |
| H01R 13/631 | (2006.01) | |

(52) U.S. Cl.
CPC ............ *H01R 31/06* (2013.01); *H01R 13/04* (2013.01); *H01R 13/631* (2013.01); *H01R 13/64* (2013.01)

(58) Field of Classification Search
CPC ... H01R 31/06; H01R 13/631; H01R 13/6456
USPC .......................................................... 439/490
See application file for complete search history.

(56) References Cited

U.S. PATENT DOCUMENTS

| | | |
|---|---|---|
| 4,179,170 A | 12/1979 | Splitt et al. |
| 4,790,026 A | 12/1988 | Gennery et al. |
| 5,502,391 A | 3/1996 | Sciacero et al. |
| 5,690,511 A | 11/1997 | Melito |
| 6,790,092 B2 | 9/2004 | Parsadayan et al. |
| 6,971,909 B2 | 12/2005 | Levesque et al. |
| 7,094,109 B2 | 8/2006 | Chou |
| 7,218,828 B2 | 5/2007 | Feustel et al. |
| 7,488,202 B2 | 2/2009 | Spitaels et al. |
| 8,075,348 B2 | 12/2011 | Mei et al. |
| 8,155,012 B2 | 4/2012 | Austermann, III et al. |
| 8,157,582 B2 | 4/2012 | Frey et al. |
| 8,194,893 B1 | 6/2012 | Lewis |
| 8,882,514 B2 | 11/2014 | Enge et al. |
| 8,902,760 B2 | 12/2014 | Austermann, III et al. |
| 9,865,976 B2 | 1/2018 | Warren |

(Continued)

*Primary Examiner* — Jean F Duverne
(74) *Attorney, Agent, or Firm* — McHale & Slavin, P.A.

(57) ABSTRACT

Disclosed is a high density (HD) cable to accommodate HD jacks. The HD bridge adapter acts as a single cable coupler between two HD jacks. The bridge can be formed with two connectors having a predetermined space between them, or be separated by a flexible extended cable for remote positioning of the connectors. In one embodiment each connector has 192 pins comprising 16 rows of 10 pins each and 4 rows of 8 pins each. Alternatively 200 pins comprising 20 rows of 10 pins each with 4 of said rows having 2 pins in a stand-by mode.

5 Claims, 6 Drawing Sheets

(56) References Cited

U.S. PATENT DOCUMENTS

| | | |
|---|---|---|
| 10,177,516 B2 * | 1/2019 | Warren .............. H01R 13/6456 |
| 2001/0053627 A1 | 12/2001 | Armistead et al. |
| 2007/0049127 A1 | 3/2007 | Nordin et al. |
| 2008/0124971 A1 | 5/2008 | Hoelzel |
| 2009/0223694 A1 | 9/2009 | Nordin et al. |
| 2010/0197162 A1 | 8/2010 | Straka et al. |
| 2012/0094525 A1 | 4/2012 | Maranto et al. |
| 2014/0146492 A1 | 5/2014 | Tang |
| 2015/0002302 A1 | 1/2015 | Garcia Sosa |
| 2016/0105214 A1 | 4/2016 | Shirakawa |
| 2016/0380397 A1 | 12/2016 | Warren |

\* cited by examiner

HIGH-DENSITY BRIDGE ADAPTER

PRIORITY CLAIM

In accordance with 37 C.F.R. § 1.76, a claim of priority is included in an Application Data Sheet filed concurrently herewith. Accordingly, the present invention is a continuation-in-part of U.S. patent application Ser. No. 15/981,444 entitled "HIGH-DENSITY BRIDGE ADAPTER", filed May 16, 2018, which is a continuation-in-part of, and claims priority to U.S. patent Ser. No. 15/864,891 entitled "HIGH-DENSITY DATA COMMUNICATIONS CONNECTION ASSEMBLY", filed Jan. 8, 2018, which claims priority to U.S. patent application Ser. No. 15/167,462, entitled "HIGH-DENSITY DATA COMMUNICATIONS CABLE", filed May 27, 2016, now issued as U.S. Pat. No. 9,865,976 on Jan. 9, 2018, which claims priority to U.S. Provisional Patent Application No. 62/166,878, entitled "HIGH-DENSITY JACK NETWORK SYSTEM", filed May 27, 2015, the contents of which are incorporated herein by reference.

FIELD OF THE INVENTION

The present invention relates generally to network systems encompassing patch panels, switches, patch cords, servers, cable testers, and printed circuit boards (PCBs), more specifically, to a network system to facilitate cable management functions, enhance space utilization, reduce manpower and time for testing network cables, and minimize reconnection errors and downtime when servicing a network by employing high-density jack connections.

BACKGROUND OF THE INVENTION

Computer networking, recording studios, radio and television networks employ elaborate systems for connecting and routing circuits for monitoring, interconnecting, and testing circuits in a convenient, flexible manner. These networks commonly include patch panels, network switches, network servers, and patch cords to connect them.

Patch panels, also known as patch bays, patch fields, or jack fields, are well-known in the field of data communication systems. Patch panels are used commonly in computer networking, recording studios, radio and television for connecting and routing circuits for monitoring, interconnecting, and testing circuits in a convenient, flexible manner.

A patch panel generally provides a plurality of network ports incorporated into a single structural element that connects incoming and outgoing lines of a local area network (LAN) or other communication, electronic or electrical systems. Patch panels are usually housed within a telecommunications closet or in an alternate location appropriate for patching cables, such as the server room in an office. Typical patch panels are mounted hardware units that include a plurality of port locations, commonly twenty-four or forty-eight, which function like a static switchboard, using cables to interconnect the computers associated with the LAN and/or to connect computers to an outside network, e.g., for connecting to the Internet or other network.

In its most basic sense, a patch panel helps organize the plurality of cables that are to be connected to the LAN, Internet, or other network, by acting as a coupler and creating a fixed point for the cables from remote network devices/stations to come back to and terminate on. Using patch cables connected to the local network switch, network access can be extended to the remote network devices/stations by being plugged into the various ports of the patch panel(s). This increases efficiency of operation, increases security for the network, and management of the system.

A network switch, or switch, is connected to a patch panel port by using a patch cable, or a plurality of patch cables when connecting multiple ports. The network switch is where the signals to and from the remote network devices are connected to the rest of the network.

Patch panels and switches are routinely mounted in what is known as an equipment rack, which permit multiple patch panels and network switches to be organized in a vertical manner. The rack configuration permits wires or cables, e.g., unshielded twisted pair (UTP) cables, coming from remote network stations to be wired to insulation-displacement connectors (IDCs) positioned on the back face of the patch panel, and couples those wires or cables to ports on the front face of the patch panel. This allows the incoming wires or cables to be organized by the ports of a patch panel so that a network administrator can connect specific remote network stations to a network switch using patch cables. Typical patch panels are substantially planar, extending backward on a horizontal plane on one level of the rack. Wires or cables incoming from remote network stations located throughout a building are routed to IDCs at the rear of the patch panel and wired to the patch panel. Patch cables are then routed to the corresponding jack or port on the front face of the patch panel, and then routed to the network switch, thus connecting the remote network station device to the LAN, Internet, or other network.

Because there will need to be at least one patch cord for every remote network device that needs to connect to the LAN, Internet, or other network, the number of patch cables needed for a medium to large office can be in the hundreds, or more. For cable management purposes, elaborate vertical and horizontal cable management trays are often used. Horizontal wire management is used to keep the front of the rack looking clean. Horizontal wire management trays connect to the rack in the same manner a patch panel or switch is attached. They usually are position in the rack between the patch panels and the switches. Cables are often routed between a network switch and patch panel via a horizontal wire management tray. Some racks will have multiple patch panels and switches and require vertical wire management trays in addition or in place of horizontal management trays. Vertical wire management trays are connected to the sides of a rack. Tracing patch cables from the patch panel to the network switch, however, can be a time consuming and difficult process. Sometimes it becomes necessary to replace network switching equipment when upgrading to stay current with industry trends or when hardware failure occurs. When this takes place all patch cables on the switch need to be removed. In many cases, special port configurations are in place on the switch specific to the remote network device connected to it. This adds an extra level of complexity and time constraint when replacing switches and requires that each patch cable be tagged and labeled so that it can be reconnected to the same port and be provisioned with the same applicable settings. The challenge of tracing patch cables, tagging them and removing them from the switch adds time and decreases efficiency of the process when removing a network switch The challenge of identifying and locating tagged patch cables from the previous step and reconnecting them to a replacement switch can be very time consuming and an opportunity for reconnection errors to occur. Many times network administrators are under a time constraint to get the network back online resulting in patch cables getting quickly re-patched to the switch with no regard for neatness or future manageability of the rack. This results in patch cables being intertwisted together and harder to separate or trace out ultimately causing additional downtime down the road with future switch upgrades or when future hardware failure occurs. Additionally, a planned network outage may be scheduled afterhours where the network administrator has sufficient time to correct the cabling mess and properly re-patch everything in a clean and professional manner.

Although wireless technologies can reduce the cable clutter hidden behind many desks, server rooms remain a haven for power cords, patch cords, network cables, and peripheral wiring. Unfortunately, many server rooms are built with little or no regard for cable organization, which can quickly escalate out of control into a cabling nightmare that can take far too long and consume too many resources to organize.

Unmanaged patch cables not only look unsightly, but they become highly susceptible to becoming twisted and crushed, both of which can prevent data signals from being properly transmitted. Tangled network cables can also make troubleshooting and maintenance tasks a nightmare. Because patch cables can be extremely difficult to identify and isolate, searching for the right cable to fix a problem can greatly increase the downtime to fix the problem.

Sometimes these problems arise because getting a server room up and running requires a massive rush; sometimes it's just careless management, sometimes the mess builds over time getting slightly worse with each alteration until it's too late. Sometimes a network installer rushes through a job because they will not be the person managing the server room once set up, and therefore they aren't considering or preparing for the efficiency of later work. Disorganization can also happen during routine adds, moves, and changes, as cables need to be re-routed, or when adding new employees or additional network devices to a network. No matter how it happens, a tangled mess of network cables can become a problem requiring many hours and a lot of patience to go back and fix; during which time the network, and productivity, will be down.

DESCRIPTION OF THE PRIOR ART

U.S. Pat. No. 7,218,828 discloses an Optical Fiber Power Splitter Module Apparatus which include at least one input port, one or more multi-fiber output ports, and an optical fiber-splitter device coupled therebetween. The optical splitter device has a first end configured as at least one single optical fiber, and a second end configured as one or more multi-fiber groups. The first end of the splitter device is coupled to the input port and the second end of the splitter device is coupled to the output ports. The first end of the splitter device is, e.g., an LC connector. The second end of the splitter device is, e.g., one or more Multi-fiber Push On (MPO) connectors. The optical splitter device is, e.g., a 1×N planar lightwave circuit (PLC) splitter, such as a 1×32 PLC splitter with an LC input connector and four 8-fiber MPO output connectors.

U.S. Pat. No. 8,155,012 discloses a System and Method for Adapting a Piece of Terminal Equipment. In accordance with the teachings of that invention, a communicating system is provided for generating and monitoring data over pre-existing conductors between associated pieces of networked computer equipment. The system includes a communication device attached to the electronic equipment that transmits information to a central module by impressing a low frequency signal on the pre-existing data lines of the remotely located equipment. A receiver in the central module monitors the low frequency data on the data lines to determine the transmitted information of the electronic equipment. The communication device may also be powered by a low current power signal from the central module. The power signal to the communication device may also be fluctuated to provide useful information, such as status information, to the communication device. Relocation of the electronic equipment with attached communication device to another location on the network is detected immediately and may be used to update a database. The invention is particularly adapted to be used with an existing Ethernet communications link or equivalent.

U.S. Pat. No. 8,157,582 discloses a Telecommunications Patch Panel, including a patch panel frame having a front face, the front face having a series of openings therein for receiving telecommunications plugs. The patch panel frame includes a tray extending rearward from a bottom portion of the front face, and a plurality of multiport bezels are mounted to the patch panel, each having a plurality of cavities, and each cavity aligned with one of the openings in the front face.

U.S. Pat. No. 8,902,760 discloses a Network and System and Optional Tethers. Disclosed is a BaseT Ethernet system having a piece of central network equipment, a piece of BaseT Ethernet terminal equipment, and data signaling pairs of conductors having first and second pairs used to carry BaseT Ethernet communication signals between the piece of central network equipment and the piece of BaseT Ethernet terminal equipment. The first and second pairs physically connect between the piece of BaseT Ethernet terminal equipment and the piece of central network equipment. The piece of central network equipment has at least one DC supply. The piece of BaseT Ethernet terminal equipment has at least one path to draw different magnitudes of current from the DC supply through a loop formed over at least one of the conductors of the first pair and at least one of the conductors of the second pair. The piece of central network equipment to detect at least two different magnitudes of the current flow through the loop.

U.S. Publication No. 2001/0053627 discloses a Single-Port Connection and Circuitry Accepting both Balanced and Unbalanced Data Signals. Disclosed is a circuit and method for connecting data lines to a digital communication system. The circuit allows either a balanced data line or an unbalanced data line to be connected to a single input port with no internal reconfiguration of the system. Connection to a balanced data line isolation transformer is provided at the port. A separate connection to ground is provided at the same port. A user connects the system to a balanced data line using a jack wired for connecting the balanced data line pair across the isolation transformer. A user connects the system to an unbalanced data line using a similar jack; however, the jack in that case is wired to short one transformer connection to the ground connection provided at the port, thereby unbalancing the transformer. In one embodiment, this second jack is part of a patch cable which accepts a coaxial connector on one end, appropriately wired to the shorted jack on the second end.

U.S. Publication No. 2007/0049127 discloses Patch Field Documentation and Revision Systems. Disclosed is a communication device and corresponding patch field system. The device includes a port module, ports, and an appliqué attached to a face of the port module. The appliqué includes a printed circuit board (PCB) with conductive pads. A patch cord connects the device with an intelligent patch panel. The patch cord contains at least one system wire. The patch panel is adapted to measure a resistance associated with each port via the system wire. An open circuit indicates that no patch cord is attached to the port, a resistance within a first range indicates that the patch cord is attached only to the port of the intelligent patch panel, and a resistance within a second range less than the first range indicates that the patch cord connects the intelligent patch panel and the device.

SUMMARY OF THE INVENTION

The present invention is directed to a network system incorporating a high density cable (HD cable) to accommodate the HD jacks, making them high density switches (HD switches) and high density patch panels (HD patch panels). This system can greatly reduce the complexity and clutter which can occur with a traditional network. The HD bridge adapter acts as a single coupler between two HD jacks.

Accordingly, it is an objective of the instant invention to provide a coupler setup which takes less time to install and connect station couplers.

Another objective is to provide an HD adaptor consisting of 192 pins formed from twenty rows wherein 16 rows have ten pins in each row and 4 rows have 8 pins in each row.

Still another objective is to provide an HD adaptor consisting of 192 pins formed from rows having ten pins in each row with 4 rows having 2 pins in each row maintained as spares.

It is yet another objective of the instant invention to provide a setup which can reduce the need for elaborate cable management techniques.

It is a further objective of the instant invention to provide a setup with a cleaner and more organized appearance.

It is a further objective of the instant invention to provide a setup that requires less downtime when swapping out a defective switch or upgrading to a newer switch.

It is a further objective of the instant invention to provide a setup which can reduce the use of excess couplers taught in the prior art.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1:
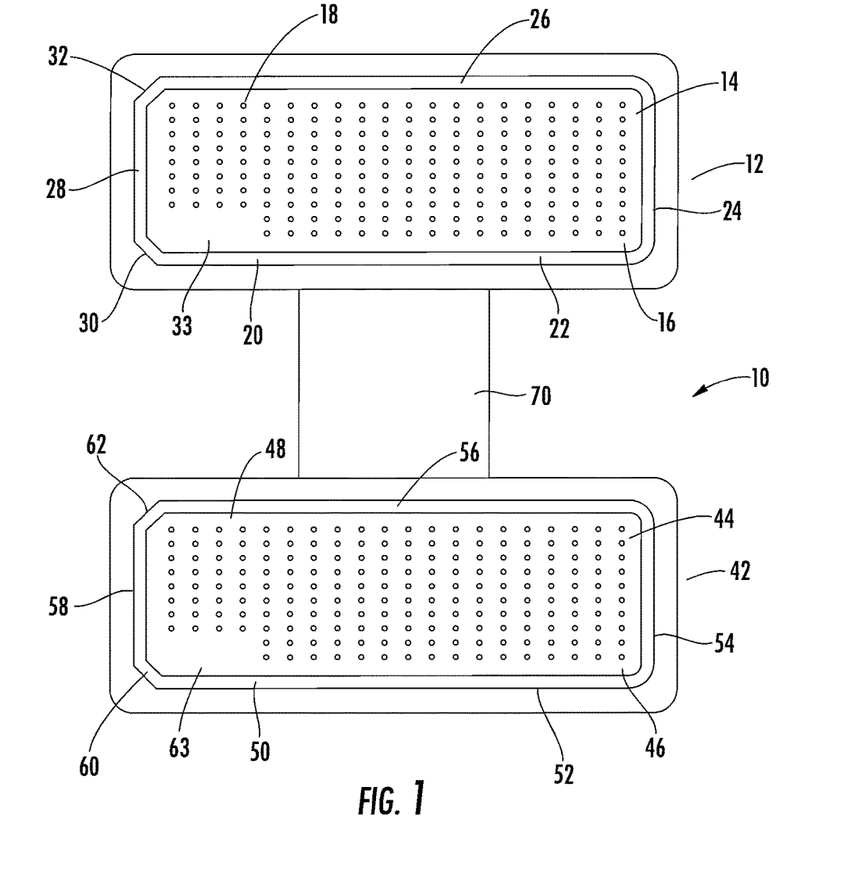
FIG. 1 is a front plane view of a 192 pin HD bridge adapter.
Figure 2:
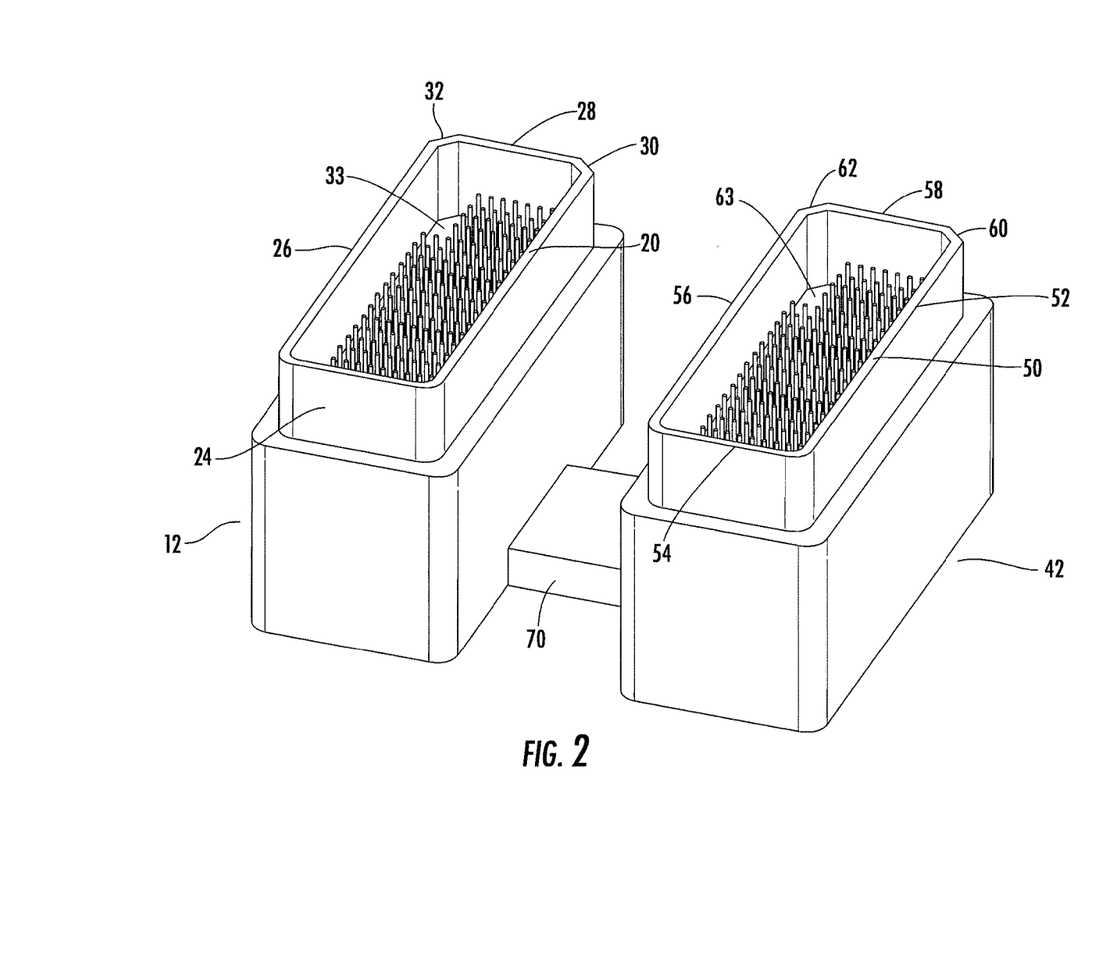
FIG. 2 is a perspective view thereof.

Referring to FIGS. 1-2, disclosed is a high-density (HD) bridge adapter connector (10) for organizing connections and used to manage and organize a computer or telecommunications network for greater efficiency. The connector (10) is comprised of a first connector (12) forming an HD plug with a 192 pin grouping (14). The pin grouping (14) consists of 16 rows (16) with 10 pins in each row and 4 rows (18) with 8 pins in each row. The first connector (12) having a lip (20) that forms three sides (22), (24), and (26) with a fourth side (28) having corner edges (30) and (32) making the first connector (12) unidirectional for positioning onto a receptacle have a reciprocal receptacle. The first connector (12) having a void area (33) by eliminating pins in certain rows.

A second connector (42) forming an HD plug with a 192 pin grouping (44). The pin grouping (44) consists of 16 rows (46) with 10 pins in each row and 4 rows (48) with 8 pins in each row. The second connector (42) having a lip (50) that forms three sides (52), (54), and (56) with a fourth side (58) having corner edges (60) and (62) making the second connector (42) unidirectional for positioning onto a receptacle have a reciprocal receptacle. The first connector (12) being electrically coupled to the second connector (42) by a coupling cable (70). The second connector (42) having a void area (63) by eliminating pins in certain rows.

Figure 3:
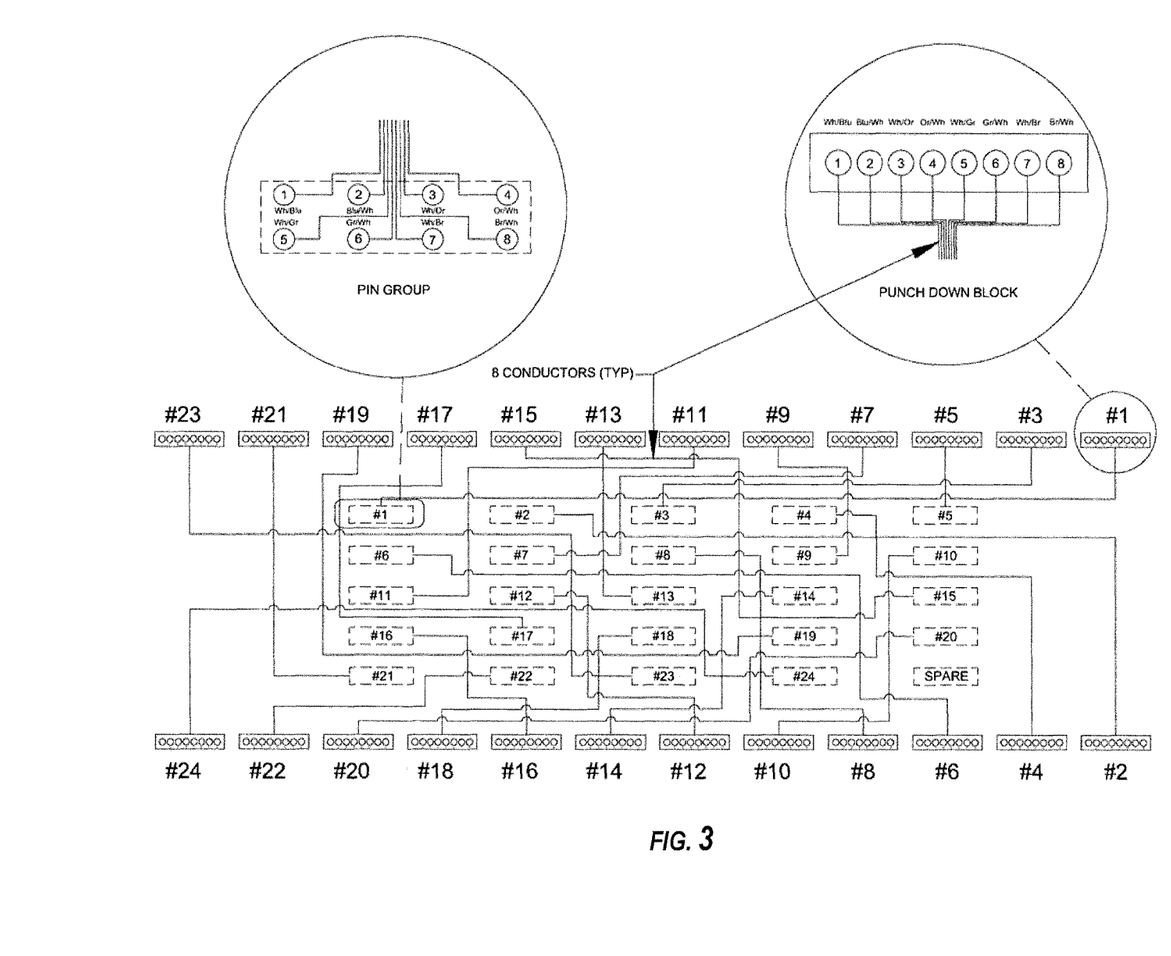
FIG. 3 is a schematic drawing of the jack pin layout.
Figure 4:
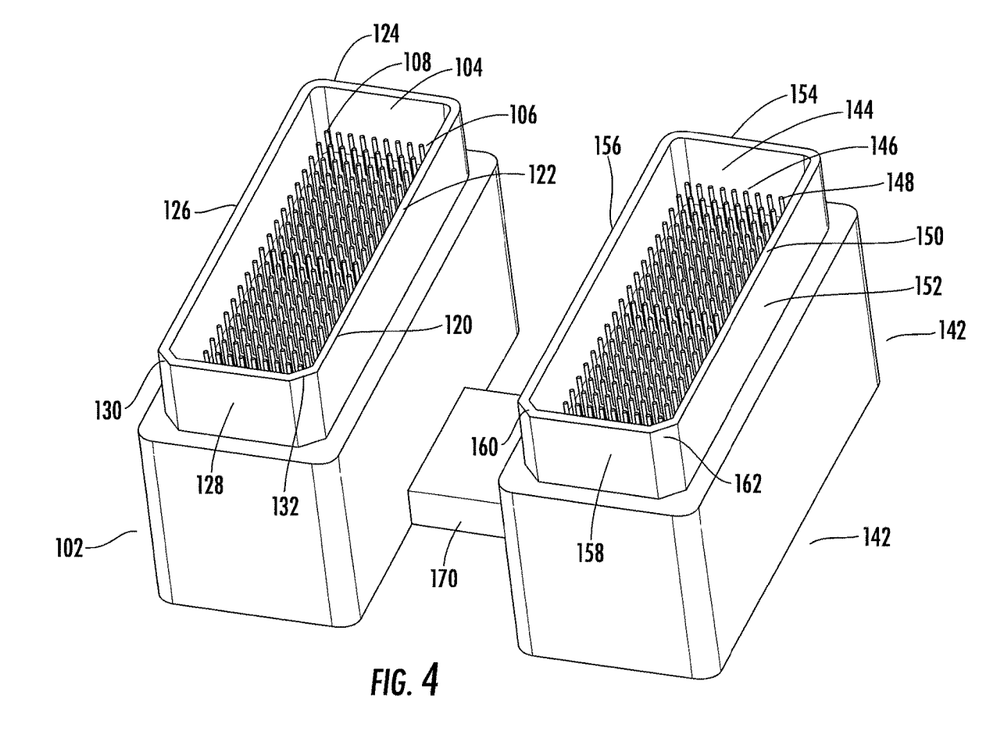
FIG. 4 is a perspective view of a 192 pin HD bridge adapter with 200 pins.

Referring to FIG. 3 set forth is the electrical coupling of the pin group to the 8 pin punch down block. The punch down block having 8 conductors for each pin group, each pin group consists of 4 rows of 2 pins. The HD bridge adapter grouping are positioned in the receptacle consists of twenty rows wherein the first 16 rows have ten pins in each row and the remaining rows, rows 17-20, have 8 pins in each row.

Figure 5:
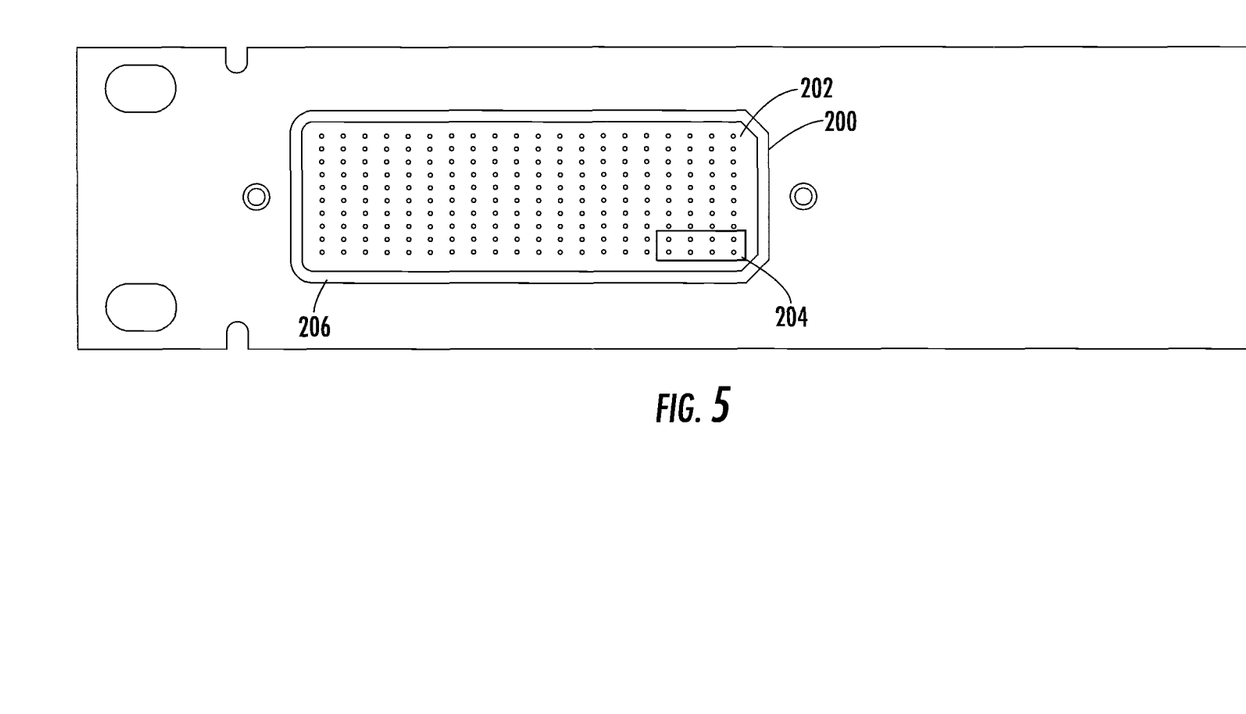
FIG. 5 is a plane view a 192 pin HD receptacle.

Referring to FIG. 5, disclosed is a high-density (HD) bridge adapter connector (100) comprised of a first connector (102) forming an HD plug with a 192 pin grouping (104). The pin grouping (104) consists of twenty rows (106) having ten pins in each row with 4 rows (108) having 2 pins in each row maintained as spares. The first connector (102) having a lip (120) that forms three sides (122), (124), and (126) with a fourth side (128) having corner edges (130) and (132) making the first connector (102) unidirectional for positioning onto a receptacle have a reciprocal receptacle.

A second connector (142) forming an HD plug with a 192 pin grouping (144). The pin grouping (144) consists of twenty rows (146) with 10 pins in each row and 4 rows (148) having 2 pins in each row maintained as spares. The second connector (142) having a lip (150) that forms three sides (152), (154), and (156) with a fourth side (158) having corner edges (160) and (162) making the second connector (142) unidirectional for positioning onto a receptacle have a reciprocal receptacle. The first connector (102) being electrically coupled to the second connector (142) by a coupling cable (170).

Figure 6:
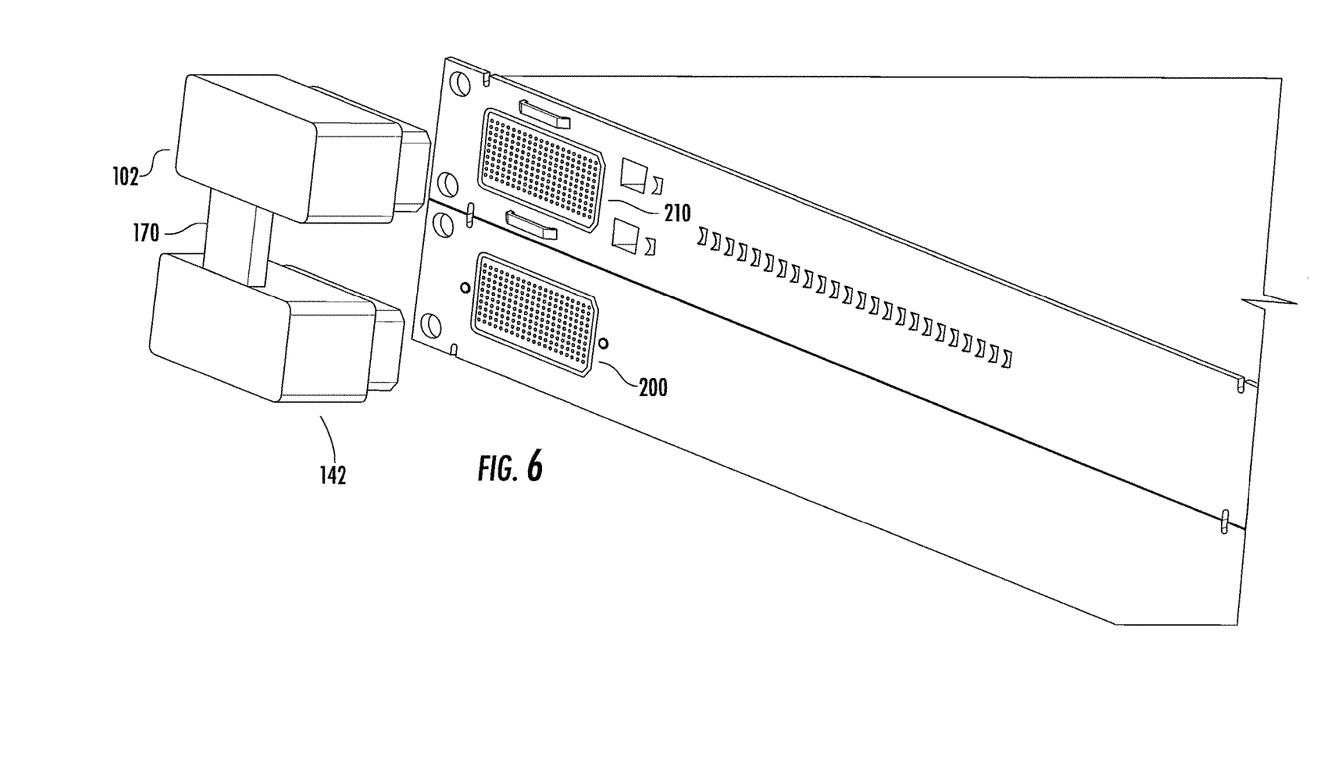
FIG. 6 is a perspective view of HD bridge adapter spaced apart from an HD receptacle.

Referring to FIG. 5 disclosed is an HD receptacle (200) consisting of twenty rows (202) with 10 pins in each row and 4 rows (204) having 2 pins in each row maintained as spares. A groove (206) is for receipt of the lip (150) of a connector thereby providing frictional engagement for securing the connector to the receptacle. As illustrated in FIG. 6, a first connector (102) is spaced apart from upper receptacle (210) and second connector (142) is spaced apart from lower receptacle (200). The coupling cable (170) relies upon a common rear edge of the first and second connector maintaining the first and second connector in a predetermined position having the same orientation.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A high density (HD) bridge adapter comprising: a first connector end having a first pin grouping consisting of 192 pins consisting of twenty rows wherein 16 rows have ten pins in each row and 4 rows have 8 pins in each row, said first connector including a lip positioned around said first pin grouping formed from a first lip defined by four sides extending outwardly from a receptacle of said first pin group, one of one sides having corner edges for directional positioning; a second connector end having a second pin grouping consisting of 192 pins consisting of twenty rows wherein 16 rows have ten pins in each row and 4 rows have 8 pins in each row, said second connector including a lip positioned around said second pin grouping formed from a second lip defined by four sides extending outwardly from a receptacle of said second pin group, one of one sides having corner edges for directional positioning; and a coupling cable positioned along a common rear edge of said first and second connector maintaining said first and second connector in a predetermined position having the same orientation and electrically coupling said first connector to said second connector.

2. The HD bridge adapter according to claim 1 wherein said first connector end is positioned adjacent to said second connector end and said cable is fixed in a stationary position.

3. The HD bridge adapter according to claim 1 wherein each said connector includes an angled sidewall requiring a matched receptacle for receipt.

4. The HD bridge adapter according to claim 1 wherein said coupling cable interconnects said first pin grouping to said second pin grouping in accordance with a predefined connector orientation.

5. The HD bridge adapter according to claim 1 wherein each said first connector includes twenty rows having ten pins in each row with 4 rows having 2 pins in each row maintained as spares, and said second connector includes twenty rows having ten pins in each row with 4 rows having 2 pins in each row maintained as spares.

* * * * *